United States Patent
Nikhara et al.

(10) Patent No.: US 10,423,049 B2
(45) Date of Patent: Sep. 24, 2019

(54) SYSTEMS AND METHODS FOR ENABLING TRANSMISSION OF PHASE DETECTION DATA

(71) Applicant: QUALCOMM Incorporated, San Diego, CA (US)

(72) Inventors: Soman Nikhara, Hyderabad (IN); Bapineedu Chowdary Gummadi, Hyderabad (IN); Ravi Shankar Kadambala, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/620,511

(22) Filed: Jun. 12, 2017

(65) Prior Publication Data

US 2018/0359409 A1 Dec. 13, 2018

(51) Int. Cl.
*H04N 5/232* (2006.01)
*G03B 13/36* (2006.01)

(52) U.S. Cl.
CPC ....... *G03B 13/36* (2013.01); *H04N 5/232122* (2018.08); *H04N 5/232411* (2018.08)

(58) Field of Classification Search
None
See application file for complete search history.

(56) References Cited

U.S. PATENT DOCUMENTS

| | | | |
|---|---|---|---|
| 9,137,436 B2 | 9/2015 | Ohara | |
| 9,451,145 B2 | 9/2016 | Takaiwa et al. | |
| 2005/0157198 A1* | 7/2005 | Larner | H04N 5/23212 348/345 |
| 2015/0373255 A1 | 12/2015 | Kim et al. | |
| 2015/0381869 A1* | 12/2015 | Mlinar | H04N 5/23212 348/222.1 |
| 2016/0241772 A1 | 8/2016 | Johnson | |
| 2016/0344922 A1 | 11/2016 | Aoki et al. | |
| 2017/0017136 A1* | 1/2017 | Kao | G03B 13/20 |

* cited by examiner

*Primary Examiner* — Mark T Monk
(74) *Attorney, Agent, or Firm* — Austin Rapp & Hardman, P.C.

(57) ABSTRACT

An electronic device is described. The electronic device includes an image sensor that is configured to capture phase detection data for automatic focusing. The electronic device also includes an automatic focusing module that is configured to dynamically enable or disable transmission of the phase detection data from the image sensor. The automatic focusing module may be configured to enable transmission of the phase detection data from the image sensor in response to detecting a scene change.

26 Claims, 8 Drawing Sheets

SYSTEMS AND METHODS FOR ENABLING TRANSMISSION OF PHASE DETECTION DATA

TECHNICAL FIELD

The present disclosure relates generally to electronic devices. More specifically, the present disclosure relates to systems and methods for dynamically enabling and disabling transmission of phase detection data from an image sensor.

BACKGROUND

Electronic devices (smartphones, cellular telephones, tablet computers, digital cameras, wireless modems, computers, digital music players, Global Positioning System units, Personal Digital Assistants, gaming devices, etc.) have become a part of everyday life. Small computing devices are now placed in everything from vehicles to housing locks. The complexity of electronic devices has increased dramatically in the last few years. For example, many electronic devices have one or more processors that help control the device, as well as a number of digital circuits to support the processor and other parts of the device.

In some cases, an electronic device may be used to capture digital images. As part of capturing digital images, the electronic device may perform autofocus operations. The autofocus operations may use phase detection (PD) data to focus a lens. However, transmitting and processing PD data requires a considerable amount of power. As can be observed from this discussion, systems and methods for dynamically enabling and disabling the transmission of phase detection data may be beneficial.

SUMMARY

An electronic device is described. The electronic device includes an image sensor that is configured to capture phase detection data for automatic focusing. The electronic device also includes an automatic focusing module that is configured to dynamically enable or disable transmission of the phase detection data from the image sensor.

The automatic focusing module may be configured to enable transmission of the phase detection data from the image sensor in response to detecting a scene change. The automatic focusing module may be configured to detect a scene change based on one or more of a gyroscope output, automatic exposure control (AEC) exposure information, a sum of absolute differences or digital image correlation. The automatic focusing module may be configured to disable transmission of the phase detection data from the image sensor until detecting a scene change.

The automatic focusing module may be configured to analyze the phase detection data to determine a lens position after enabling transmission of the phase detection data from the image sensor in response to detecting a scene change. The automatic focusing module may also be configured to subsequently disable transmission of the phase detection data from the image sensor.

The automatic focusing module may be further configured to perform a fine search to determine a final lens position after disabling transmission of the phase detection data from the image sensor. The automatic focusing module may be configured to perform the fine search to determine a final lens position based on image data from the image sensor without the phase detection data.

The electronic device may also include an image signal processor that is configured to receive image data and the phase detection data from the image sensor when transmission of the phase detection data from the image sensor is enabled. The image signal processor may also be configured to receive image data from the image sensor when transmission of the phase detection data from the image sensor is disabled.

The electronic device may also include an image signal processor that is configured to receive phase detection data from the image sensor when transmission of the phase detection data from the image sensor is enabled. The image signal processor may also be configured to receive image data from the image sensor when transmission of the phase detection data from the image sensor is disabled.

A method is also described. The method includes capturing, by an image sensor, phase detection data for automatic focusing. The method also includes dynamically enabling or disabling, by an automatic focusing module, transmission of the phase detection data from the image sensor.

An apparatus is also described. The apparatus includes means for capturing, by an image sensor, phase detection data for automatic focusing. The apparatus also includes means for dynamically enabling or disabling, by an automatic focusing module, transmission of the phase detection data from the image sensor.

A non-transitory tangible computer readable medium storing computer executable code is also described. The computer readable medium includes code for causing an image sensor to capture phase detection data for automatic focusing. The computer readable medium also includes code for causing an automatic focusing module to dynamically enable or disable transmission of the phase detection data from the image sensor.

DETAILED DESCRIPTION

Various configurations are described with reference to the Figures, where like reference numbers may indicate functionally similar elements. The systems and methods as generally described and illustrated in the Figures could be arranged and designed in a wide variety of different configurations. Thus, the following more detailed description of several configurations, as represented in the Figures, is not intended to limit scope, but is merely representative.

Figure 1:
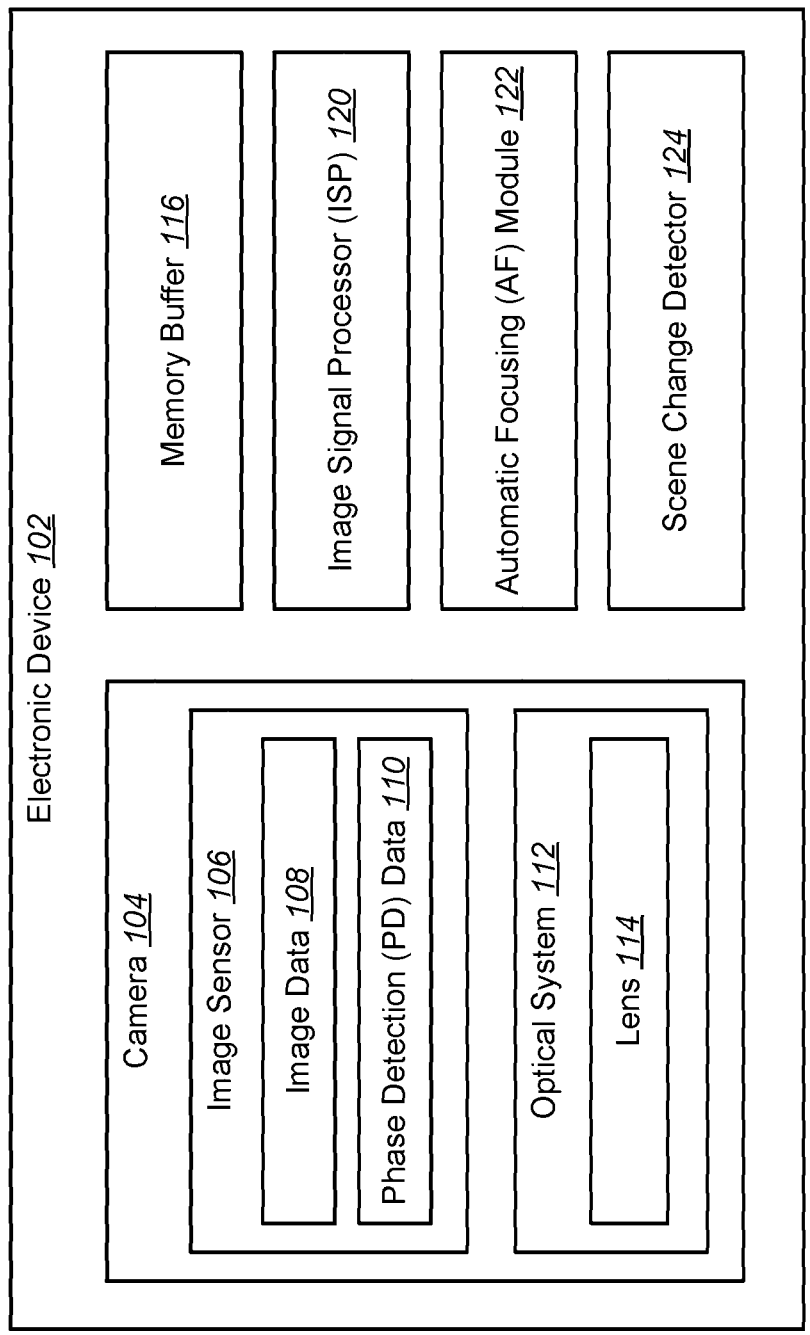
FIG. 1 is a block diagram illustrating an electronic device configured to dynamically enable and disable transmission of phase detection (PD) data from an image sensor.

FIG. 1 is a block diagram illustrating an electronic device 102 configured to dynamically enable and disable transmission of phase detection data 110 from an image sensor 106. The electronic device 102 may also be referred to as a wireless communication device, a mobile device, mobile station, subscriber station, client, client station, user equipment (UE), remote station, access terminal, mobile terminal, terminal, user terminal, subscriber unit, etc. Examples of electronic devices 102 include laptop or desktop computers, digital cameras, cellular phones, smart phones, wireless modems, e-readers, tablet devices, gaming systems, robots, aircraft, unmanned aerial vehicles (UAVs), automobiles, etc. Some of these devices may operate in accordance with one or more industry standards.

The electronic device 102 may be configured to perform automatic focusing (AF) operations. The term "automatic focusing" may also be referred to as autofocus, autofocus or the like.

In an implementation, an electronic device 102 may include one or more cameras 104. A camera 104 may include an image sensor 106 and an optical system 112. The optical system 112 may include one or more lenses 114 that focus images of objects that are located within the field of view of the optical system 112 onto the image sensor 106. The focus of the lens 114 on the image sensor 106 may be determined by a lens position.

In an implementation, the electronic device 102 may also include a camera software application and a display screen. When the camera application is running, image data 108 of objects that are located within the field of view of the optical system 112 may be recorded by the image sensor 106. The image data 108 may be stored in a memory buffer 116. In some implementations, the camera 104 may be separate from the electronic device 102 and the electronic device 102 may receive image data 108 from one or more cameras 104 external to the electronic device 102. In yet another implementation, the electronic device 102 may receive image data 108 from a remote storage device.

To capture the image data 108, an image sensor 106 may expose image sensor elements to the image scene. The image sensor elements within image sensor 106 may, for example, capture intensity values representing the intensity of the light of the scene at a particular pixel position. In some cases, each of the image sensor elements of the image sensor 106 may only be sensitive to one color, or color band, due to the color filters covering the image sensor elements. For example, the image sensor 106 may include an array of red, green and blue (RGB) filters. The image sensor 106 may utilize other color filters, however, such as cyan, magenta, yellow and key (CMYK) color filters. Thus, each of the image sensor elements of the image sensor 106 may capture intensity values for only one color. The image data 108 may include pixel intensity and/or color values captured by the image sensor elements of the image sensor 106.

Although the present systems and methods are described in terms of captured image data 108, the techniques discussed herein may be used on any digital image. For example, the image data 108 may be acquired from frames from a video sequence. Therefore, the terms video frame and digital image may be used interchangeably herein.

In addition to image data 108, the image sensor 106 may be configured to capture phase detection (PD) data 110. Therefore, the image sensor 106 may be configured to provide both image data 108 and/or PD data 110. The PD data 110 may be used for automatic focusing (AF) operations. For example, the image data 108, the PD data 110 or both may be provided to an AF module 122 that determines a position of the lens 114 based on the PD data 110. This process of determining a lens position for optimal focus is referred to as autofocus or an autofocus operation.

The electronic device 102 may include an image signal processor (ISP) 120 that performs image processing operations on image data 108 and/or phase detection (PD) data 110. The image processor 120 may receive image data 108 and/or PD data 110 from the image sensor 106 or from the memory buffer 116 and performs image processing.

The ISP 120 may be realized by one or more microprocessors, digital signal processors (DSPs), application specific integrated circuits (ASICs), field programmable gate arrays (FPGAs), or any other equivalent discrete or integrated logic circuitry, or a combination thereof. In some implementations, the ISP 120 may form part of an encoder-decoder (CODEC) that encodes the image information according to a particular encoding technique or format, such as Motion Pictures Expert Group (MPEG)-2, MPEG-4, International Telecommunication Union (ITU) H.263, ITU H.264, Joint Photographic Experts Group (JPEG), Graphics Interchange Format (GIF), Tagged Image File Format (TIFF) or the like. The ISP 120 may perform additional processing on the image information, such as image cropping, compression, enhancement and the like.

It should be noted that the depiction of different features as units or modules is intended to highlight different functional aspects of image processing that may be performed by ISP 120, and does not necessarily imply that such units or modules must be realized by separate hardware, software and/or firmware components. Rather, functionality associated with one or more units or modules may be integrated within common hardware, software components and/or firmware components.

An image sensor 106 that is configured to capture PD data 110 may be referred to as dual pixel technology. Each pixel may be represented by two sub pixel data (e.g., left and right). In an implementation, pixels of the image sensor 106 may be divided into a left portion and a right portion. Light rays may pass through a pair of apertures (one aperture corresponding to the left portion and the other aperture corresponding to the right portion). After passing through the apertures, the light may be projected onto the image sensor 106.

The left sub pixel may measure one light profile based on where the light is detected on the left portion of image sensor 106. The right sub pixel may measure another light profile based on where the light is detected on the right portion of image sensor 106. The PD data 110 includes the left and right sub pixel data.

The difference between the two measured light profiles provides a phase difference. When an object is in focus, the light profiles converge and there is no phase difference. The difference between light profiles measured by the left and right sub pixels results in a phase difference, this phase difference may be used to perform automatic focus. Combining the left and right sub pixel data provides the image data 108.

The image sensor 106 may be configured to transmit the PD data 110 to one or more subsystems of the electronic device 102. For example, the image sensor 106 may be configured to transmit the PD data 110 to the ISP 120 on a data bus. In an implementation, the ISP 120 may provide the PD data 110 or PD statistics to the AF module 122 to perform automatic focus.

The AF module 122 may check the phase difference between the left portion and the right portion of the pixels. Based on the phase difference, the AF module 122 may determine where the actual focus point is. For example, the AF module 122 may determine an amount of the phase difference. The AF module 122 may then instruct the optical system 112 to move the lens 114 to a position that minimizes the phase difference.

It should be noted that the image sensor 106 may provide PD data 110 in different formats. Furthermore, PD data parsing to generate PD statistics for the AF module 122 may be done in hardware via the ISP 120 (if supported) or a software-based phase detection library (if the ISP 120 does not support processing the PD data 110). The software-based phase detection library is referred to herein as a PD parser.

In a first PD data format, the image sensor 106 of the electronic device 102 may be configured to transmit both image data 108 and PD data 110. In this format, the image sensor 106 may provide both image data 108 and downsampled PD data 110 for a full field of view (FOV). The image data 108 may be provided to the ISP 120 as it is and will be processed by the ISP 120. This first PD data format is described in more detail in connection with FIG. 6.

In a second PD data format, the image sensor 106 may be configured to transmit only PD data 110 from which image data 108 is obtained. In an implementation, the image sensor 106 may capture PD data 110 at two times (2×) the number of pixels for full FOV. The 2× PD data 110 may be processed by the ISP 120 or the PD parser (if the ISP 120 does not support processing the PD data 110). The ISP 120 or PD parser may generate the image data 108 by fusing the left and right PD data 110. The ISP 120 or PD parser may also generate the PD statistics that will be used by AF module 122 to perform AF operations. This second PD data format is described in more detail in connection with FIG. 7.

In current approaches, PD data 110 is transmitted from the image sensor 106 even when the PD data 110 is not needed for autofocus operations. In these approaches, when the image sensor 106 is active, the image sensor 106 transmits a continuous stream of PD data 110. For example, from a camera launch to a camera exit, the image sensor 106 may capture PD data 110, which is transmitted to the ISP 120 for processing.

Continuously transmitting PD data 110 from the image sensor 106 increases the number of memory write operations and ISP processing (referred to as CPU utilization). Because of this requirement, the data rate from the image sensor 106 and the ISP 120 may be doubled, which in turn requires higher clocks for the image sensor 106 and/or the ISP 120.

Therefore, having an image sensor 106 provide both image data 108 as well as PD data 110 may double the data rate for which the data is transmitted from the image sensor 106 to other circuitry (such as the ISP 120). The increased data rate consumes significant amounts of power because of higher ISP and/or image sensor clocks.

The systems and methods described herein reduce power consumption and improve the CPU utilization by dynamically enabling the transmission of PD data 110 from the image sensor 106 only when PD data 110 it is needed. The described systems and methods do not impact image quality. Furthermore, the described systems and methods save significant power.

The AF module 122 may be configured to dynamically enable and disable transmission of PD data 110 from the image sensor 106. With autofocus, the PD data 110 is only needed when there is a scene change. For example, the AF module 122 may only need to perform a lens position search when a scene changes within the field of view of the optical system 112. In an example, when there is motion in a scene, the AF module 122 may determine a lens position to achieve an optimum focus for the scene. When there is no motion in the scene, the AF module 122 converges on a lens position and autofocus is no longer performed until another scene change occurs. It is beneficial to disable transmission of PD data 110 from the image sensor 106 when the AF module 122 is not actively performing autofocus.

The AF module 122 may be configured to disable transmission of PD data 110 from the image sensor 106 until a scene change is detected. In an example, when no scene change is detected, the AF module 122 may send a signal to the image sensor 106 to turn off transmission of the PD data 110. For instance, the AF module 122 may send a signal to the image sensor 106 to turn off the PD data stream to the ISP 120. The image sensor 106 may continue to provide image data 108 while transmission of the PD data 110 is disabled.

It should be noted that in a dual pixel technology image sensor 106, the same pixels may be used for capturing PD data 110 and image data 108. Irrespective of whether transmission of the PD data 110 is enabled or disabled, the image sensor 106 may capture the PD data 110. However, when transmission of the PD data 110 is disabled, the image sensor 106 may not send the captured PD data 110 on a bus to other circuitry (e.g., the ISP 120). In an implementation, internal hardware of the image sensor 106 that is used to send the PD data 110 may be disabled in response to receiving the signal from the AF module 122 to the disable PD data transmission.

The AF module 122 may be configured to enable the transmission of PD data 110 in response to detecting a scene change. For example, when a scene change is detected, the AF module 122 may send a signal to the image sensor 106 to turn on the transmission of PD data 110. The AF module 122 may then use the PD data 110 received from the image sensor 106 to perform an autofocus operation. Therefore, transmission of PD data 110 may be dynamically enabled only when PD data 110 is needed.

The electronic device 102 may be configured with a scene change detector 124. The scene change detector 124 may implement one or more scene change detection mechanisms. In an implementation, the scene change detector 124 may determine a scene change based on movement of the electronic device 102. In an approach, the scene change detector 124 may determine movement of the electronic device 102 based on angular movement as indicated by the output of a gyroscope located on the electronic device 102.

In another implementation, the scene change detector 124 may determine a scene change based on automatic exposure control (AEC) exposure information. For example, an AEC module (not shown) may provide exposure information to the scene change detector 124. When the AEC exposure information changes within a threshold amount from one image frame to another, this may indicate a scene change.

In yet another implementation, the scene change detector 124 may determine a scene change based on a sum of absolute differences (SAD). In image processing, the SAD is a measure of the similarity between images or portions of image blocks. The SAD may be determined by taking the absolute difference between each pixel in an original block and each corresponding pixel in a subsequent block. If the SAD is above a certain threshold, then this may indicate a scene change.

In yet another implementation, the scene change detector 124 may determine a scene change based on a digital image correlation. The digital image correlation may be performed to detect changes from one image frame to another image frame. If the digital image correlation is above a certain threshold, then this may indicate a scene change. It should be noted that other mechanisms may be utilized by the scene change detector 124 to determine a scene change.

When detecting a scene change, the scene change detector 124 may send an indication to the AF module 122 that the scene has changed. The AF module 122 may enable the transmission of PD data 110 from the image sensor 106 in response to detecting the scene change. For example, the AF module 122 may send a PD data enable signal to the image sensor 106.

Upon enabling transmission of the PD data 110 from the image sensor 106, the AF module 122 may perform an autofocus operation using the PD data 110. In an implementation, the AF module 122 may receive PD statistics from the ISP 120 and/or a PD parser. The AF module 122 may analyze the PD data 110 (or the PD statistics) to determine a lens position. This operation may be referred to as an AF search or lens position search. The AF module 122 may provide the lens position to the optical system 112, which moves the lens 114 into the peak lens position.

At this point, the PD data 110 is no longer needed for autofocus until there is another scene change. The AF module 122 may disable transmission of PD data 110 from the image sensor 106 after performing the autofocus operation.

In an implementation, the AF module 122 may be configured to perform a fine search to determine a final lens position after disabling transmission of the PD data 110 from the image sensor 106. In this case, the AF module 122 may perform a fine search for accurate peak lens position. The AF module 122 may determine a final lens position using image data 108 from the image sensor 106 without using the PD data 110.

In another implementation, the AF module 122 may check the PD data 110 and based on that will move the lens 114 to a focus position. This focus position may be approximately accurate. To get a very accurate position, the AF module 122 may perform the fine search using contrast AF data provided by the ISP 120. Generally, a high pass filter may run for an image pixel in the ISP 120 to determine the contrast AF data. The contrast AF data may be gathered at different lens positions. The lens position where the contrast AF data is maximized is the best focus position. The lens 114 may be moved to that lens position.

It should also be noted that enabling and disabling transmission of the PD data 110 from the image sensor 106 may have only a one frame delay. This delay is negligible in normal light and frame rates (e.g., 30 frames per second (fps)).

In the case of the first PD data format described above, the ISP 120 may receive image data 108 with or without PD data 110. The ISP 120 may receive the image data 108 and the PD data 110 from the image sensor 106 when transmission of the PD data 110 is enabled. For example, when a scene change is detected and the AF module 122 enables transmission of the PD data 110, the ISP 120 may receive both the image data 108 and the PD data 110 from the image sensor 106. When transmission of the PD data 110 is disabled, the ISP 120 may receive the image data 108 from the image sensor 106 without PD data 110. For example, when a scene change is not detected and the AF module 122 disables transmission of the PD data 110, then the ISP 120 may receive only the image data 108 from the image sensor 106.

In the case of the second PD data format described above, the ISP 120 may receive PD data 110 106 from the image sensor 106 when transmission of the PD data 110 is enabled. For example, when a scene change is detected and the AF module 122 enables transmission of the PD data 110, the ISP 120 may receive 2× PD data 110 from the image sensor 106. When transmission of the PD data 110 is disabled, the ISP 120 may receive image data 108 from the image sensor 106 without PD data 110. For example, when a scene change is not detected and the AF module 122 disables transmission of the PD data 110, then the image sensor 106 may convert the PD data 110 to image data 108. The image sensor 106 may then send only the image data 108 to the ISP 120.

The systems and methods described herein provide significant power savings without reducing image quality. By disabling transmission of the PD data 110 from the image sensor 106, the ISP clock, image sensor clock and data transfer clock are reduced. Additionally, by disabling PD data transmission, power consumption may be decreased due to reduced memory writes. Furthermore, the memory buffer 116 may be saved by almost half when PD data transmission is disabled, thus making more memory available for other operations.

Figure 2:
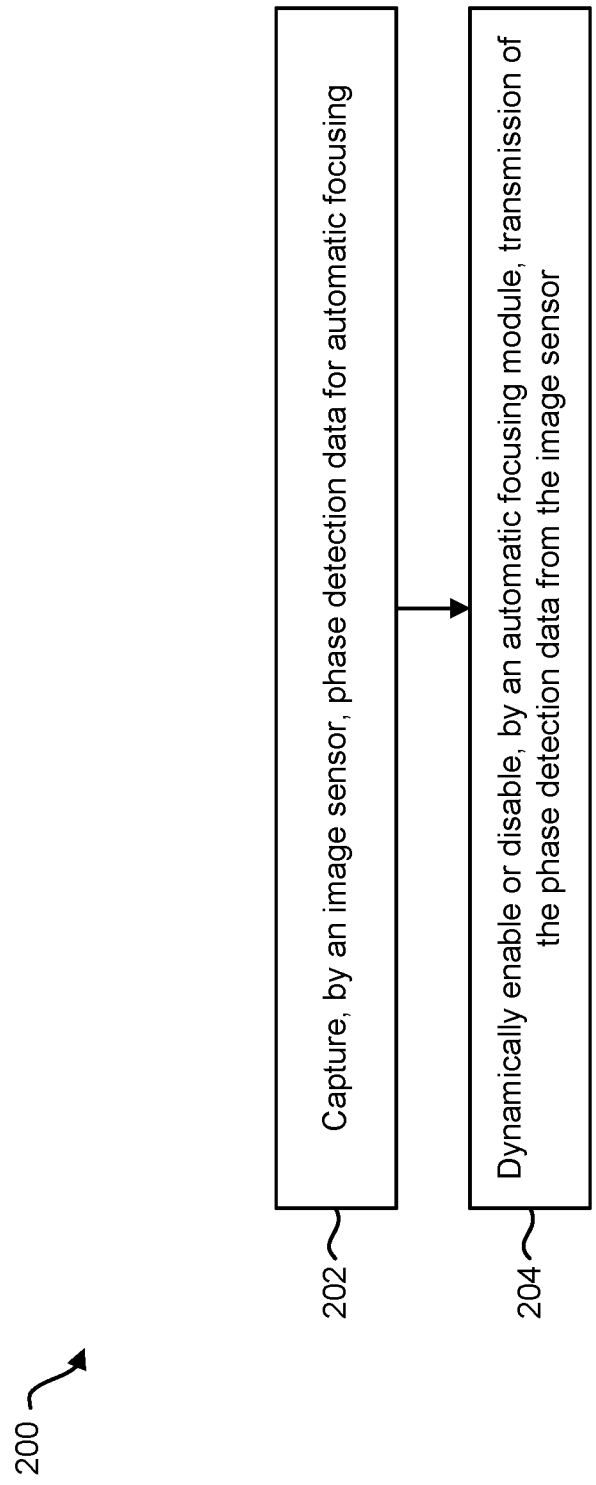
FIG. 2 is a flow diagram illustrating a method for dynamically enabling and disabling transmission of PD data from an image sensor.

FIG. 2 is a flow diagram illustrating a method 200 for dynamically enabling and disabling transmission of PD data 110 from an image sensor 106. The method 200 may be implemented by an electronic device 102. In an implementation, the electronic device 102 may be configured with an image sensor 106, an AF module 122 and an ISP 120.

The electronic device 102 may capture 202 PD data 110 for automatic focusing by the image sensor 106. In an implementation, the image sensor 106 may be configured to capture image data 108 and PD data 110. In another implementation, the image sensor 106 may be configured to capture PD data 110 from which image data 108 is generated. The image sensor 106 may be configured to provide the PD data 110 to the ISP 120 or a PD parser. The ISP 120 or PD parser may be configured to provide the PD data 110 to the AF module 122.

The electronic device 102 may dynamically enable or disable 204 transmission of the PD data 110 from the image sensor 106. The AF module 122 may be configured to disable transmission of the PD data 110 from the image sensor 106 until detecting a scene change. In an example, the AF module 122 may send a signal to the image sensor 106 to turn off transmission of the PD data 110 to the ISP 120.

The AF module 122 may be configured to enable transmission of the PD data 110 from the image sensor 106 in response to detecting a scene change. For example, the AF module 122 may send a signal to the image sensor 106 to turn on transmission of the PD data 110. In an implementation, the AF module 122 may analyze the PD data 110 to determine a lens position after enabling transmission of the PD data 110 from the image sensor 106 in response to detecting a scene change. The AF module 122 may subsequently disable transmission of the PD data 110 from the image sensor 106.

The electronic device 102 may detect a scene change based on one or more scene detection mechanisms. These scene detection mechanisms may include a gyroscope output (e.g., angular movement), automatic exposure control (AEC) exposure information, a sum of absolute differences, digital image correlation or a combination thereof.

In an implementation corresponding to the first PD data format, the ISP 120 may be configured to receive the image data 108 and the PD data 110 from the image sensor 106 when transmission of the PD data 110 is enabled. The ISP 120 may be configured to receive the image data 108 from the image sensor 106 without PD data 110 when transmission of the PD data 110 is not enabled.

In an implementation corresponding to the second PD data format, the ISP 120 may be configured to receive PD data 110 from the image sensor 106 when transmission of the PD data 110 from the image sensor 106 is enabled. In this case, the ISP 120 may generate image data 108 by combining the PD data 110. The ISP 120 may be configured to receive image data 108 from the image sensor 106 without PD data 110 when transmission of the PD data 110 from the image sensor 106 is disabled. In this case, the image sensor 106 may combine the PD data 110 to generate the image data 108, which is sent to the ISP 120.

Figure 3:
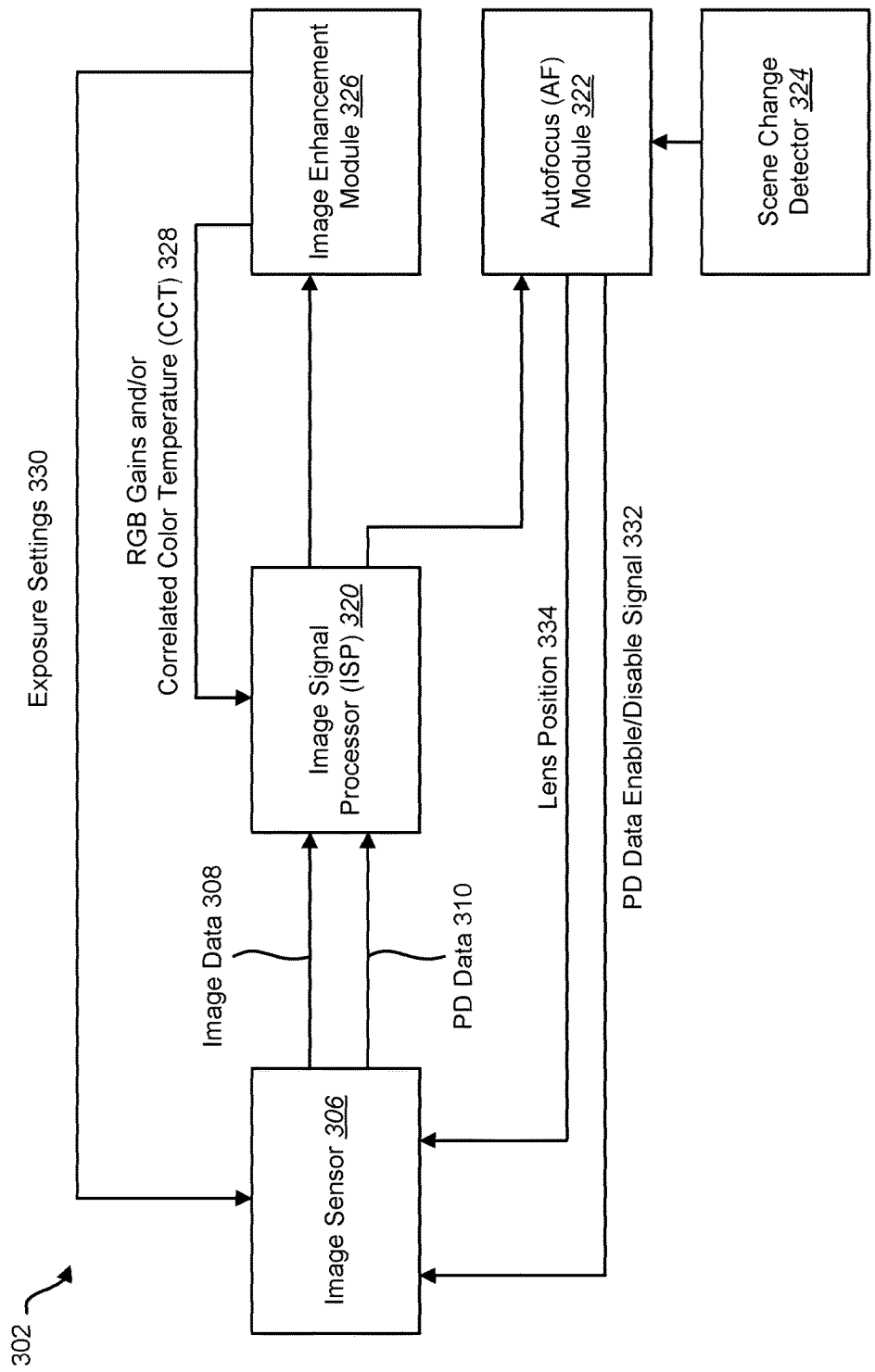
FIG. 3 is a block diagram illustrating another configuration of an electronic device configured to dynamically enable and disable transmission of PD data from an image sensor.

FIG. 3 is a block diagram illustrating another configuration of an electronic device 302 configured to dynamically enable and disable transmission of PD data 310 from an image sensor 306. The electronic device 302 may be configured with an image sensor 306. The image sensor 306 may capture image data 308 and/or PD data 310. The image sensor 306 may provide the image data 308 and/or PD data 310 to an ISP 320.

The electronic device 302 may be configured with one or more image enhancement modules 326 to perform various image enhancement operations. For example, the electronic device 302 may be configured with an auto white balance (AWB) module and/or an automatic exposure control (AEC) module. The image enhancement module 326 may provide RGB gains and/or a correlated color temperature (CCT) 328 to the ISP 320. The image enhancement module 326 may also provide exposure settings 330 to the image sensor 306. In an implementation, the AEC may be configured to provide exposure information to a scene change detector 324.

The AF module 322 may be configured to enable or disable transmission of the PD data 310 from the image sensor 306. The AF module 322 may send a PD enable/disable signal 332 to the image sensor 306 to either enable (i.e., turn on) or disable (i.e., turn off) transmission of the PD data 310 to the ISP 320.

An autofocus search for a lens position 334 is only needed when a scene changes. Therefore, the AF module 322 may enable transmission of the PD data 310 from the image sensor 306 when a scene change is detected. The AF module 322 may perform an autofocus search to determine the lens position 334 and may subsequently disable transmission of the PD data 310 from the image sensor 306. Then, the AF module 322 may dynamically re-enable transmission of the PD data 310 from the image sensor 306 upon detecting another scene change.

The electronic device 302 may be configured with a scene change detector 324 that detects when a scene changes. The scene change detector 324 may detect a scene change based on one or more of a gyroscope output (e.g., angular movement), automatic exposure control (AEC) exposure information, a sum of absolute differences or digital image correlation.

The scene change detector 324 may notify the AF module 322 of a scene change. In response to detecting the scene change, the AF module 322 may send a PD data enable signal 332 to the image sensor 306. The image sensor 306 may then send the PD data 310 to the ISP 320. The ISP 320 may send the PD data 310 to the AF module 322.

Upon receiving the PD data 310, the AF module 322 may analyze the PD data 310 to determine a lens position 334 to move the lens 114 to a peak position for correct focus. The AF module 322 may send the lens position 334 to the optical system 112 of image sensor 306. The lens 114 may be focused according to the lens position 334. For example, an electromechanical system may adjust the focus of the optical system 112 according to the lens position 334 determined by the AF module 322.

Upon finishing the AF search and sending the lens position 334, the AF module 322 may disable transmission of the PD data 310 from the image sensor 306. For example, the AF module 322 may send a PD data disable signal 332 to the image sensor 306. The image sensor 306 may stop transmitting the PD data 310 in response to the PD data disable signal 332. However, the image sensor 306 may continue to provide image data 308 to the ISP 320 while transmission of the PD data 310 is disabled. Thus, the electronic device 302 may optimize power consumption by disabling transmission of the PD data 310 when it is not needed.

In an implementation, the AF module 322 may perform a fine search for accurate peak position of the lens position 334 after disabling transmission of the PD data 310. The AF module 322 may determine a final lens position 334 using image data 308 from the image sensor 306 without the PD data 310.

To summarize, the scene change detector 324 may trigger the AF search. Whenever a scene change is detected, transmission of the PD data 310 from the image sensor 306 may be enabled. Based on the PD data 310, the optical system 112 may move the lens to the lens position 334 determined by the AF module 322. Transmission of the PD data 310 from the image sensor 306 may then be disabled. The AF module 322 may perform a final search for the lens position 334. The electronic device 302 may then perform digital image operations without the PD data 310.

Figure 4:
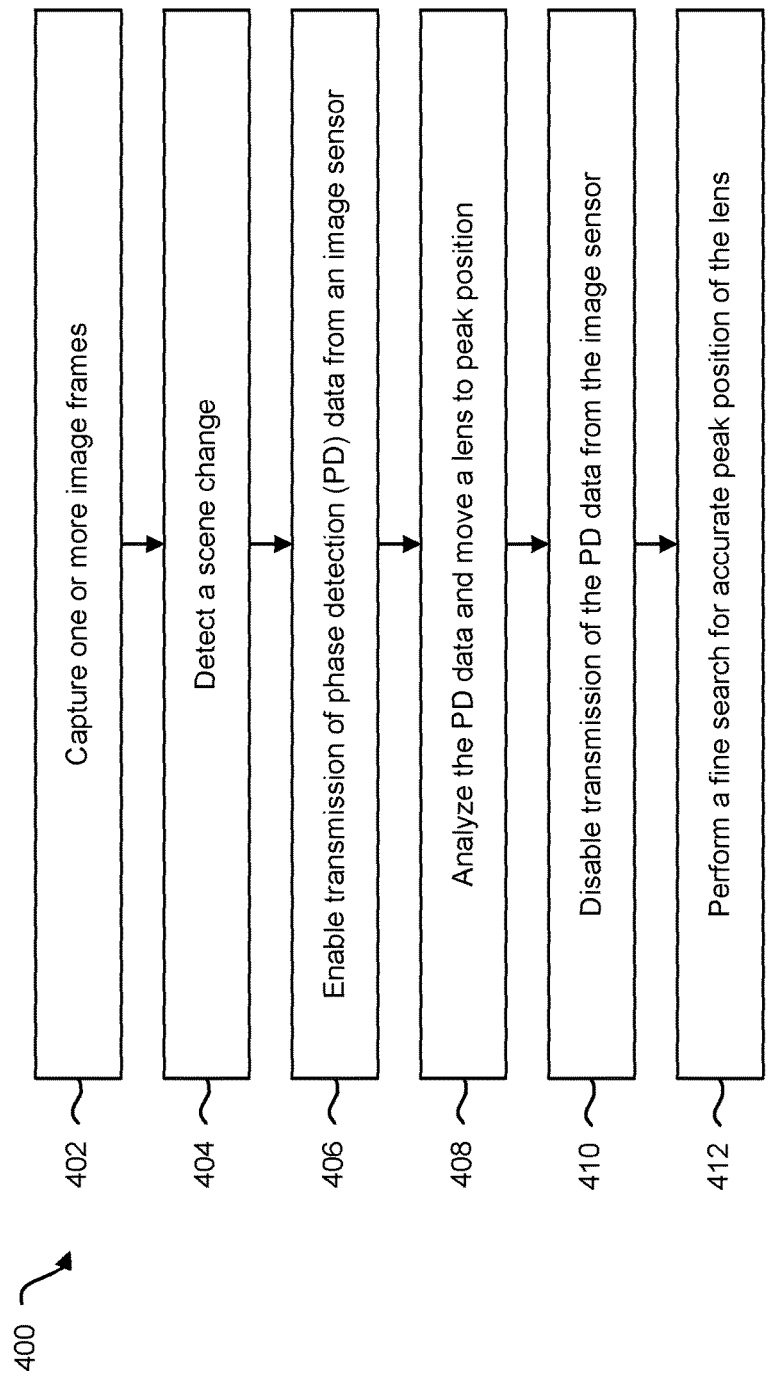
FIG. 4 is a flow diagram illustrating another configuration of a method for dynamically enabling and disabling transmission of PD data.

FIG. 4 is a flow diagram illustrating another configuration of a method 400 for dynamically enabling and disabling transmission of PD data 110. The method 400 may be implemented by an electronic device 102. In an implementation, the electronic device 102 may be configured with an image sensor 106, an AF module 122, a scene change detector 124 and an ISP 120.

In a first PD data format, the image sensor 106 may be configured to capture image data 108 and PD data 110. In a second PD data format, the image sensor 106 may be configured to capture 2× PD data 110 from which image data 108 and PD statistics are obtained.

The electronic device 102 may capture 402 one or more image frames. As used herein, a frame is an individual image. The image sensor 106 may capture image data 108 and/or PD data 110 for a number of image frames. In an implementation, the image sensor 106 may capture a certain number of image frames at a certain rate (e.g., 30 fps).

The electronic device 102 may detect 404 a scene change. In an implementation, a scene change detector 124 may detect a scene change based on movement of the electronic device 102 (e.g., angular movement as detected by a gyroscope). In another implementation, the scene change detector 124 may detect a scene change based on changes in the image frames. For example, the scene change detector 124 may detect a scene change based on a sum of absolute differences (SAD), AEC exposure information and/or digital image correlation. In yet another implementation, the scene change detector 124 may detect a scene change based on a combination of these or other scene change detection mechanisms.

The electronic device 102 may enable 406 transmission of PD data 110 from the image sensor 106. For example, the AF module 122 may send a PD data enable signal 332 to the image sensor 106. Upon receiving the PD data enable signal 332, the image sensor 106 may send PD data 110. The PD data 110 may be received by the ISP 120, which sends the PD data 110 (or PD statistics) to the AF module 122.

The electronic device 102 may analyze 408 the PD data 110 and move a lens 114 to peak lens position 334. For example, the AF module 122 may determine a lens position 334 for optimal focus based on the PD data 110. The AF module 122 may send the lens position 334 to the optical system 112 of image sensor 106. The lens 114 may be focused (e.g., moved or positioned) according to the lens position 334.

The electronic device 102 may disable 410 transmission of the PD data 110 from the image sensor 106. Upon performing the autofocus search for the lens position 334, the AF module 122 may send a PD data disable signal 332 to the image sensor 106. The image sensor 106 may disable (i.e., stop) the transmission of the PD data 110 in response to the PD data disable signal 332.

The electronic device 102 may perform 412 a fine search for accurate peak position of the lens 114. After disabling transmission of the PD data 110 from the image sensor 106, the AF module 322 may continue to determine a final lens position 334 using image data 108 from the image sensor 106 without the PD data 110.

Figure 5:
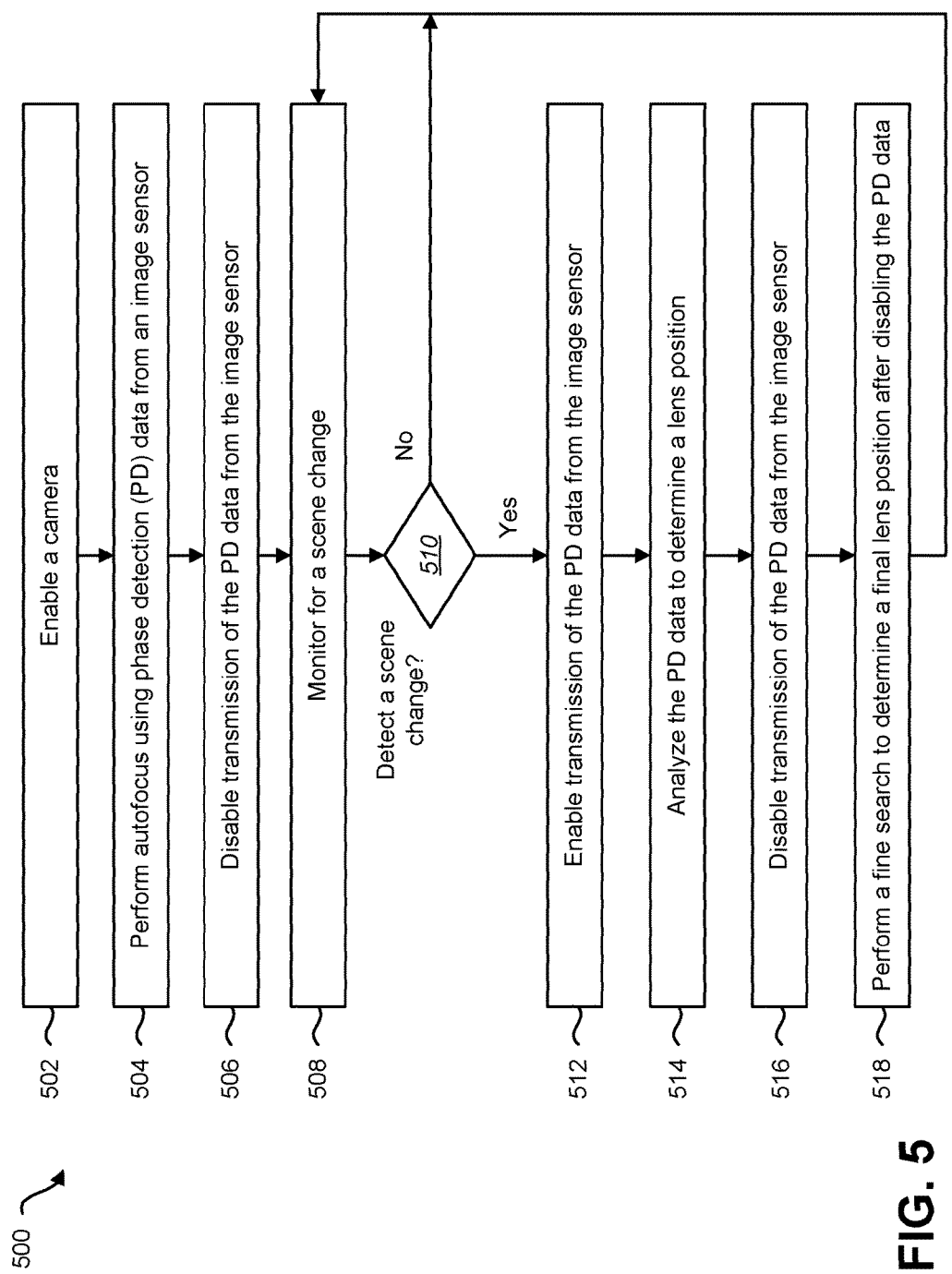
FIG. 5 is a flow diagram illustrating yet another configuration of a method for dynamically enabling and disabling transmission of PD data.

FIG. 5 is a flow diagram illustrating yet another configuration of a method 500 for dynamically enabling and disabling transmission of PD data 110. The method 500 may be implemented by an electronic device 102. In an implementation, the electronic device 102 may be configured with an image sensor 106, an AF module 122 and an ISP 120.

In a first PD data format, the image sensor 106 may be configured to send image data 108 and down-sampled PD data 110 to an ISP 120. In a second PD data format, the image sensor 106 may be configured to send 2× PD data 110 from which image data 108 and PD statistics are obtained.

The electronic device 102 may enable 502 a camera 104. For example, a camera application may be launched (on a smartphone, for instance). In another example, a digital camera may be turned on or placed in an active mode to capture a digital image.

The electronic device 102 may perform 504 autofocus using PD data 110 from the image sensor 106. When the camera 104 is first launched, the image sensor 106 may capture PD data 110. In this case, the scene is new to the electronic device 102. The AF module 122 may perform an initial autofocus using the PD data 110 or PD statistics. The AF module 122 may provide the optical system 112 with a lens position 334.

The electronic device 102 may disable 506 transmission of the PD data 110 from the image sensor 106. After completing the autofocus operation, the AF module 122 no longer needs PD data 110 unless the scene changes. To conserve energy, the electronic device 102 may disable 506 transmission of the PD data 110 from the image sensor 106. In an implementation, the AF module 122 may send a PD data disable signal 332 to the image sensor 106. The image sensor 106 may continue to provide image data 108 to the ISP 120.

The electronic device 102 may monitor 508 for a scene change. While monitoring 508 for a scene change, the electronic device 102 may determine whether one or more criteria have been met to indicate a scene change. In an implementation, the electronic device 102 may detect a scene change based on movement of the electronic device 102 (e.g., angular movement as detected by a gyroscope). In another implementation, the electronic device 102 may detect a scene change based on changes in the image frames. For example, the electronic device 102 may detect a scene change based on a sum of absolute differences (SAD), AEC exposure information and/or digital image correlation. In yet another implementation, the electronic device 102 may detect a scene change based on a combination of these or other scene change detection mechanisms.

The electronic device 102 may determine 510 whether a scene change has been detected. If the one or more scene change criteria have not been met, then the electronic device 102 may continue to monitor 508 for a scene change. In this case, the image sensor 106 may continue to provide image data 108 to the ISP 120 without PD data 110.

If the electronic device 102 determines 510 that a scene change is detected, then the electronic device 102 may enable 512 transmission of the PD data 110 from the image sensor 106. For example, the AF module 122 may send a PD data enable signal 332 to the image sensor 106. Upon receiving the PD data enable signal 332, the image sensor 106 may send the PD data 110 in addition to the image data 108. The image data 108 and PD data 110 may be received by the ISP 120, which sends the PD data 110 to the AF module 122.

The electronic device 102 may analyze 514 the PD data 110 to determine a lens position 334. This may be accomplished as described in connection with FIG. 4.

The electronic device 102 may disable 516 transmission of the PD data 110 from the image sensor 106. Upon moving the lens 114 to the target position based on the phase detection data 110, the AF module 122 may send a PD data disable signal 332 to the image sensor 106. The image sensor 106 may disable (i.e., stop) transmission of the PD data 110 in response to the PD data disable signal 332.

The electronic device 102 may perform 518 a fine search for accurate peak position of the lens 114. After disabling transmission of the PD data 110 from the image sensor 106, the AF module 322 may continue to determine a final lens position 334 using image data 108 from the image sensor 106 without the PD data 110.

The electronic device 102 may continue to monitor 508 for a scene change. If the electronic device 102 detects 510 another scene change, then the electronic device 102 may re-enable 512 transmission of the PD data 110 from the image sensor 106 to perform another autofocus operation. Otherwise, the electronic device 102 may continue image processing operations using captured image data 108 without the PD data 110.

Figure 6:
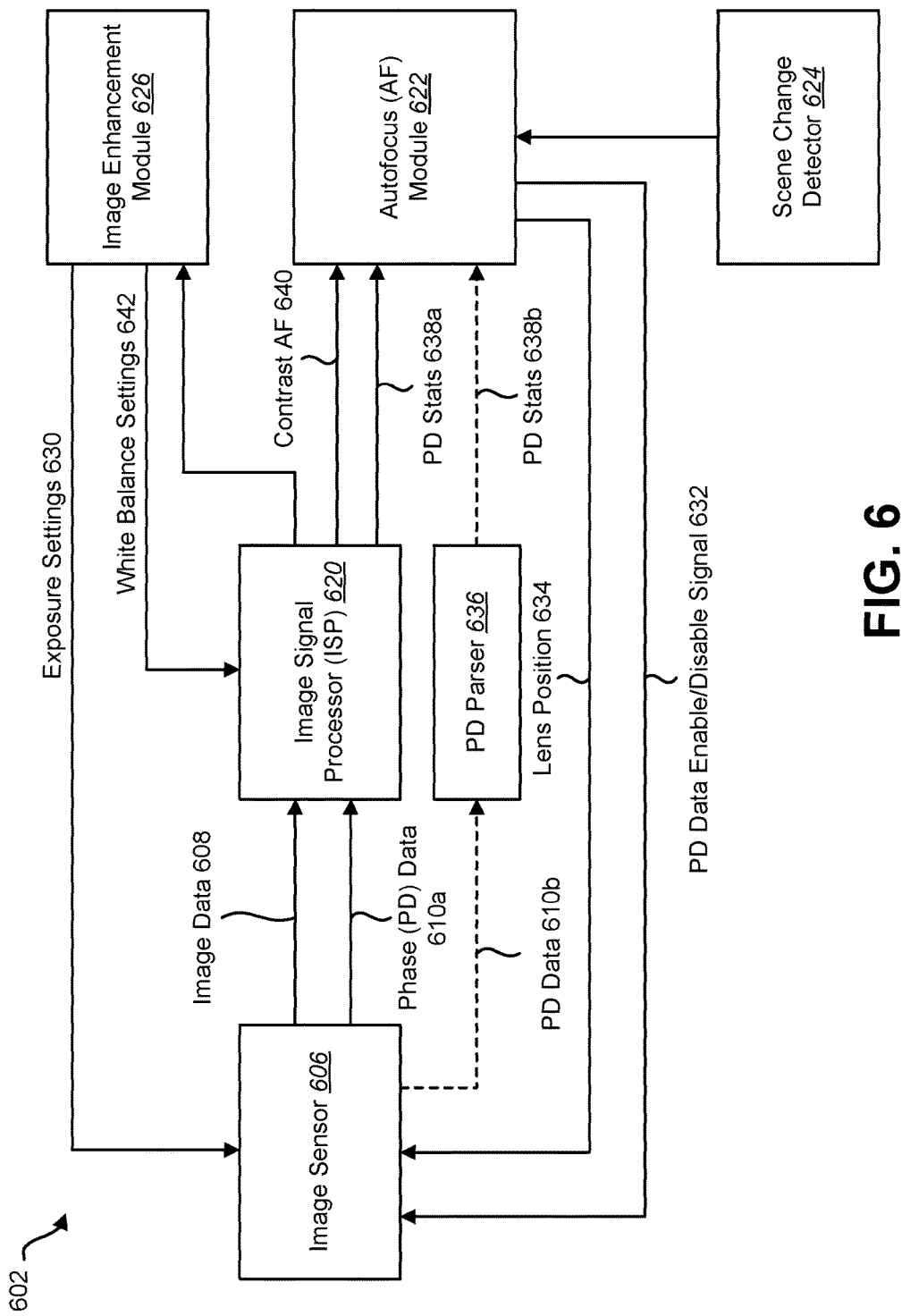
FIG. 6 is a block diagram illustrating another configuration of an electronic device configured to dynamically enable and disable transmission of PD data.

FIG. 6 is a block diagram illustrating another configuration of an electronic device 602 configured to dynamically enable and disable transmission of PD data 610. The electronic device 602 may be configured with an image sensor 606. The image sensor 606 may capture image data 608 and PD data 610. The image sensor 606 may provide the image data 608 and PD data 610 to an ISP 620. This is an example of the first PD data format described in connection with FIG. 1.

In this first PD data format, the image sensor 606 of the electronic device 602 may be configured to capture both image data 608 and PD data 610. In this format, the image sensor 606 may provide both image data 608 and down-sampled PD data 610 for a full field of view (FOV). The image data 608 may be provided to the ISP 620 as it is and will be processed by the ISP 620. In an example of the first PD data format, image data 608 may be 10 megapixels (MP) and the down-sampled PD data 610*a* may be 2.5 MP.

The ISP 620 may send a contrast AF signal 640 based on the image data 608. The ISP 620 may provide the contrast AF signal 640 by running a high pass filter on image data 608, which is used to do a fine search for the lens position 634.

If supported by the ISP 620, the image sensor 606 may send the down-sampled PD data 610*a* to the ISP 620. The ISP 620 may process the PD data 610*a* to generate PD statistics (stats) 638*a*, which are provided to the AF module 622. The PD statistics 638*a* may be generated by parsing the PD data 610*a*.

If the ISP 620 does not support PD data processing, the image sensor 606 may send the down-sampled PD data 610*b* to a PD parser 636 to generate the PD statistics 638*b* for the AF module 622. The PD statistics 638*b* may be generated by parsing the PD data 610*b*.

The electronic device 602 may be configured with one or more image enhancement modules 626 to perform various image enhancement operations. For example, the electronic device 602 may be configured with an auto white balance (AWB) module and/or an automatic exposure control (AEC) module. The image enhancement module 626 may provide white balance settings to the ISP 642. The image enhancement module 626 may also provide exposure settings 630 to the image sensor 606. In an implementation, the AEC may be configured to provide exposure information to a scene change detector 624.

The AF module 622 may be configured to enable or disable transmission of the PD data 610 from the image sensor 606. The AF module 622 may send a PD enable/disable signal 632 to the image sensor 606 to either enable (i.e., start) or disable (i.e., stop) transmission of the PD data 610 to the ISP 620 or PD parser 636.

An autofocus search for a lens position 634 is only needed when a scene changes. Therefore, the AF module 622 may enable transmission of the PD data 610 from the image sensor 606 when a scene change is detected. The AF module 622 may perform an autofocus search to determine the lens position 634 and may subsequently disable transmission of the PD data 610 from the image sensor 606. Then, the AF module 622 may dynamically re-enable transmission of the PD data 610 from the image sensor 606 upon detecting another scene change.

The electronic device 602 may be configured with a scene change detector 624 that detects when a scene changes. The scene change detector 624 may detect a scene change based on one or more of a gyroscope output (e.g., angular movement), automatic exposure control (AEC) exposure information, a sum of absolute differences or digital image correlation.

The scene change detector 624 may notify the AF module 622 of a scene change. In response to detecting the scene change, the AF module 622 may send a PD data enable signal 632 to the image sensor 606. The image sensor 606 may then send the PD data 610 to the ISP 620 or the PD parser 636. The ISP 620 or the PD parser 636 may send the PD statistics 638 to the AF module 622.

Upon receiving the PD statistics 638, the AF module 622 may analyze the PD statistics 638 to determine a lens position 634 to move the lens 114 to a peak position for correct focus. The AF module 622 may send the lens position 634 to the optical system 112 of image sensor 606. The lens 114 may be focused according to the lens position 634. For example, an electromechanical system may adjust the focus of the optical system 112 according to the lens position 634 determined by the AF module 622.

Upon finishing the AF search and sending the lens position 634, the AF module 622 may disable transmission of the PD data 610 from the image sensor 606. For example, the AF module 622 may send a PD data disable signal 632 to the image sensor 606. The image sensor 606 may stop transmitting the PD data 610 in response to the PD data disable signal 632. However, the image sensor 606 may continue to provide image data 608 to the ISP 620 while transmission of the PD data 610 is disabled. Thus, the electronic device 602 may optimize power consumption by disabling transmission of the PD data 610 when it is not needed.

In an implementation, the AF module 622 may perform a fine search for accurate peak position of the lens position 634 after disabling transmission of the PD data 610 from the image sensor 606. The AF module 622 may determine a final lens position 634 using image data 608 from the image sensor 606 without the PD data 610.

To summarize, the scene change detector 624 may trigger the AF search. Whenever a scene change is detected, transmission of the PD data 610 from the image sensor 606 may be enabled. Based on the PD data 610, the optical system 112 may move the lens to the lens position 634 determined by the AF module 622. Transmission of the PD data 610 from the image sensor 606 may be disabled. The AF module 622 may perform a final search for the lens position 634. The electronic device 602 may then perform digital image operations without the PD data 610.

Figure 7:
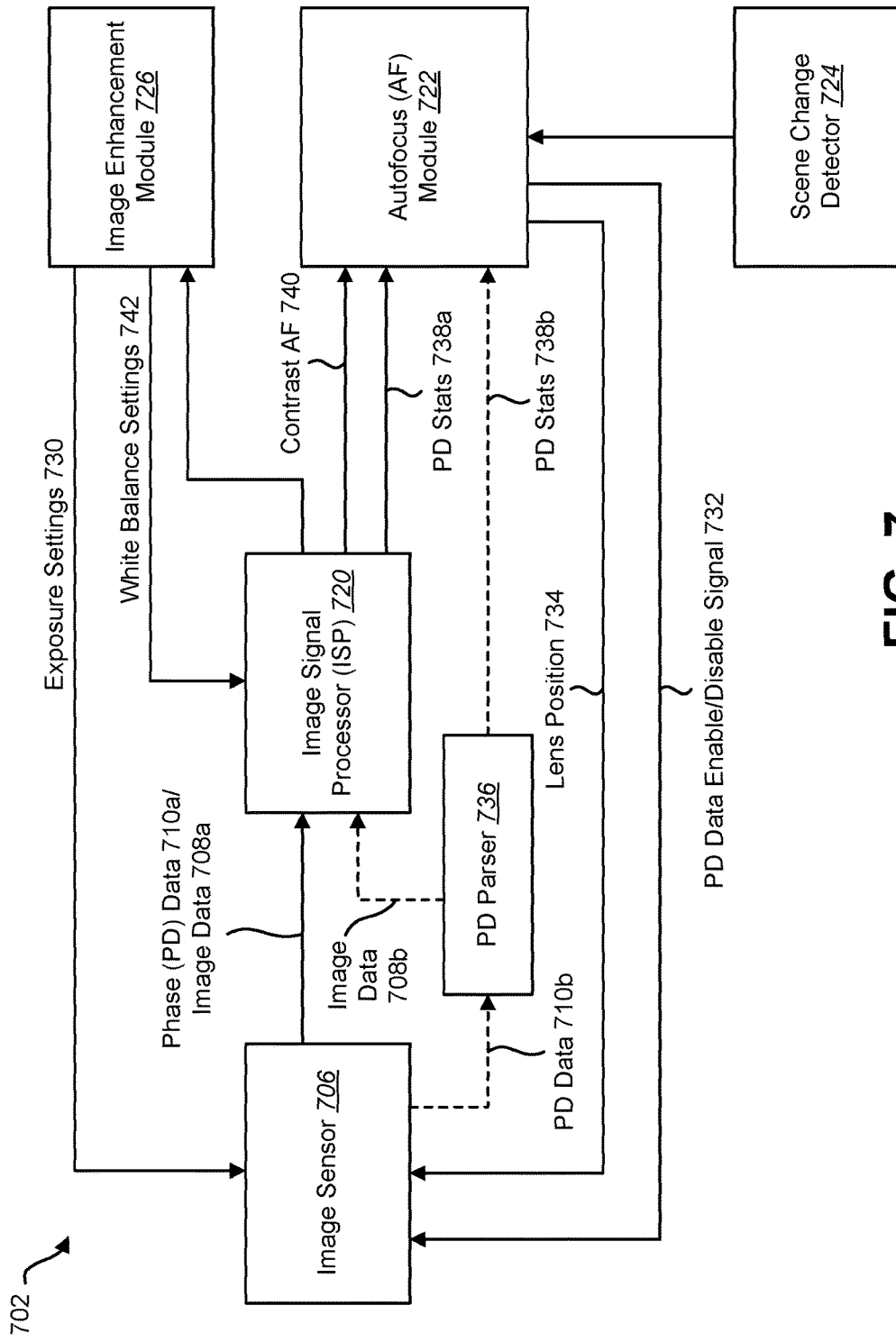
FIG. 7 is a block diagram illustrating yet another configuration of an electronic device configured to dynamically enable and disable transmission of PD data.

FIG. 7 is a block diagram illustrating yet another configuration of an electronic device 702 configured to dynamically enable and disable transmission of PD data 710. The electronic device 702 may be configured with an image sensor 706. The image sensor 706 may capture PD data 710. This is an example of the second PD data format described in connection with FIG. 1.

The image sensor 706 may be configured to send PD data 710, from which image data 708 is obtained. For example, the image sensor 706 may capture PD data 710 at two times (2×) the number of pixels for full FOV. The 2× PD data 710 may include left and right PD data 710. Image data 708 may be generated from the PD data 710 by merging the left and right PD data 710.

In an example of the second PD data format, the image resolution of the image data 708 may be 10 megapixels (MP). In this case, the PD data 710 may be 20 MP, with 10 MP for the left PD data 710 and 10 MP for the right PD data 710. Internally, the image sensor 706 may have a 20 megapixel sensor. Each pixel may be divided into left and right sub pixels as described in connection with FIG. 1. If transmission of PD data 710 is enabled, the image sensor 706 may send the 20 MP PD data 710 to either the ISP 720 or a PD parser 736. Parsing may be performed to retrieve the image data 708 and PD statistics 738. For example, the ISP 720 may process the 20 MP of PD data 710*a* to generate the 10 MP image data 708 and PD statistics 738*a*.

When transmission of PD data 710 is disabled, then the image sensor 706 may internally combine the PD data 710 from the left and right sub pixels. The image sensor 706 may then send the 10 MP image data 708*a* on the same data transfer line to the ISP 720. In this case, no parsing is needed.

If the ISP 720 supports processing of the PD data 710, the image sensor 706 may send the PD data 710*a* to the ISP 720. The ISP 720 may generate image data 708 by fusing the left and right PD data 710*a*. The ISP 720 may send a contrast AF signal 740 based on the image data 708. The ISP 720 may also generate the PD statistics 738*a* that will be used by AF module 722 to perform AF operations. The PD statistics 738*a* may be generated by parsing the PD data 710*a*.

If the ISP 720 does not support PD data processing, the image sensor 706 may send the PD data 710*b* to a PD parser

736. The PD parser 736 may generate image data 708*b* by fusing the left and right PD data 710*b*. The PD parser 736 may send the image data 708*b* to the ISP 720. The PD parser 736 may also generate the PD statistics 738*b* for the AF module 722. The PD statistics 738*b* may be generated by parsing the PD data 710*b*.

The electronic device 702 may be configured with one or more image enhancement modules 726 to perform various image enhancement operations. For example, the electronic device 702 may be configured with an auto white balance (AWB) module and/or an automatic exposure control (AEC) module. The image enhancement module 726 may provide white balance settings to the ISP 742. The image enhancement module 726 may also provide exposure settings 730 to the image sensor 706. In an implementation, the AEC may be configured to provide exposure information to a scene change detector 724.

The AF module 722 may be configured to enable or disable transmission of the PD data 710 from the image sensor 706. The AF module 722 may send a PD enable/disable signal 732 to the image sensor 706 to either enable or disable transmission of the PD data 710.

In this second PD data format, when transmission of the PD data 710 is enabled, the image sensor 706 may send the 2× PD data 710 to either the ISP 720 or the PD parser 736. In other words, when transmission of PD data 710 is enabled, the image sensor 706 may send both the left and right PD data 710 to the ISP 720 or PD parser 736 for processing.

When transmission of the PD data 710 is disabled, the image sensor 706 may generate the image data 708*a* from the left and right PD data 710. However, the image sensor 706 may only send the image data 708*a* to the ISP 720 without sending the 2× PD data 710. In other words, when transmission of PD data 710 is disabled, the image sensor 706 may send only image data 708*a* to the ISP 720. When transmission of the PD data 710 is disabled in this fashion, the image sensor 706 may send image data 708*a* for full FOV without the 2× PD data 710, which will significantly reduce the power consumption of the electronic device 702.

An autofocus search for a lens position 734 is only needed when a scene changes. Therefore, the AF module 722 may enable transmission of the PD data 710 from the image sensor 706 when a scene change is detected. The AF module 722 may perform an autofocus search to determine the lens position 734 and may subsequently disable transmission of the PD data 710 from the image sensor 706. Then, the AF module 722 may dynamically re-enable transmission of the PD data 710 from the image sensor 706 upon detecting another scene change.

The electronic device 702 may be configured with a scene change detector 724 that detects when a scene changes. The scene change detector 724 may detect a scene change based on one or more of a gyroscope output (e.g., angular movement), automatic exposure control (AEC) exposure information, or a sum of absolute differences or digital image correlation.

The scene change detector 724 may notify the AF module 722 of a scene change. In response to detecting the scene change, the AF module 722 may send a PD data enable signal 732 to the image sensor 706. The image sensor 706 may then transmit the PD data 710 (e.g., the full 2× PD data 710) to the ISP 720 or the PD parser 736. The ISP 720 or the PD parser 736 may send the PD statistics 738 to the AF module 722.

Upon receiving the PD statistics 738, the AF module 722 may analyze the PD statistics 738 to determine a lens position 734 to move the lens 114 to a peak position for correct focus. The AF module 722 may send the lens position 734 to the optical system 112 of image sensor 706. The lens 114 may be focused according to the lens position 734. For example, an electromechanical system may adjust the focus of the optical system 112 according to the lens position 734 determined by the AF module 722.

Upon finishing the AF search and sending the lens position 734, the AF module 722 may disable transmission of the PD data 710 from the image sensor 706. For example, the AF module 722 may send a PD data disable signal 732 to the image sensor 706. The image sensor 706 may stop transmitting PD data 710 in response to the PD data disable signal 732. However, the image sensor 706 may continue to provide image data (lx) 708 to the ISP 720 while transmission of the PD data 710 is disabled. Thus, the electronic device 702 may optimize power consumption by disabling transmission of the PD data 710 when it is not needed.

In an implementation, the AF module 722 may perform a fine search for accurate peak position of the lens position 734 after disabling transmission of the PD data 710. The AF module 722 may determine a final lens position 734 using image data 708 from the image sensor 706 without the PD data 710.

Figure 8:
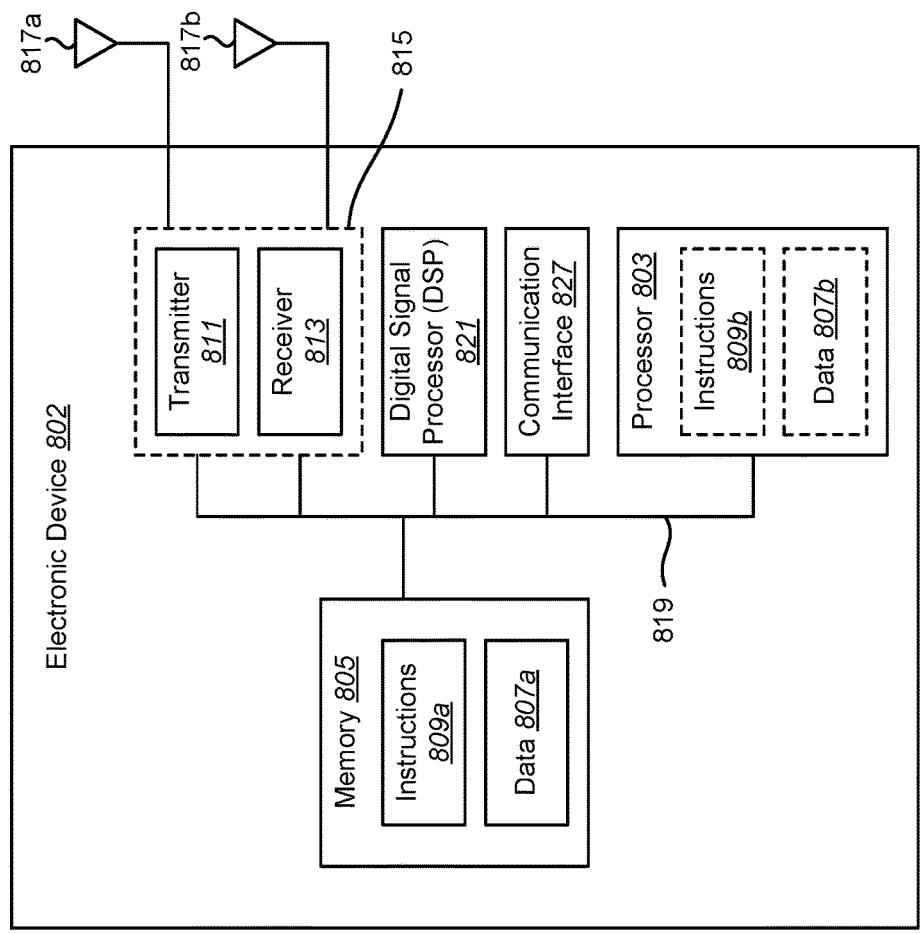
FIG. 8 illustrates certain components that may be included within an electronic device.

FIG. 8 illustrates certain components that may be included within an electronic device 802. The electronic device 802 described in connection with FIG. 8 may be an example of and/or may be implemented in accordance with the electronic device 102 described in connection with FIG. 1.

The electronic device 802 includes a processor 803. The processor 803 may be a general purpose single- or multi-core microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 803 may be referred to as a central processing unit (CPU). Although just a single processor 803 is shown in the electronic device 802 of FIG. 8, in an alternative configuration, a combination of processors (e.g., an ARM and DSP) could be used.

The electronic device 802 also includes memory 805 in electronic communication with the processor 803 (i.e., the processor can read information from and/or write information to the memory). The memory 805 may be any electronic component capable of storing electronic information. The memory 805 may be configured as Random Access Memory (RAM), Read-Only Memory (ROM), magnetic disk storage media, optical storage media, flash memory devices in RAM, on-board memory included with the processor, Erasable Programmable Read-Only Memory (EPROM), Electrically Erasable Programmable Read-Only Memory (EEPROM), registers and so forth, including combinations thereof.

Data 807*a* and instructions 809*a* may be stored in the memory 805. The instructions 809*a* may include one or more programs, routines, sub-routines, functions, procedures, code, etc. The instructions 809*a* may include a single computer-readable statement or many computer-readable statements. The instructions 809*a* may be executable by the processor 803 to implement the methods disclosed herein. Executing the instructions 809*a* may involve the use of the data 807*a* that is stored in the memory 805. When the processor 803 executes the instructions 809, various portions of the instructions 809*b* may be loaded onto the processor 803, and various pieces of data 807*b* may be loaded onto the processor 803.

The electronic device 802 may also include a transmitter 811 and a receiver 813 to allow transmission and reception of signals to and from the electronic device 802 via one or more antennas 817a-b. The transmitter 811 and receiver 813 may be collectively referred to as a transceiver 815. As used herein, a "transceiver" is synonymous with a radio. The electronic device 802 may also include (not shown) multiple transmitters, multiple antennas, multiple receivers and/or multiple transceivers.

The electronic device 802 may include a digital signal processor (DSP) 821. The electronic device 802 may also include a communications interface 827. The communications interface 827 may allow a user to interact with the electronic device 802.

The various components of the electronic device 802 may be coupled together by one or more buses, which may include a power bus, a control signal bus, a status signal bus, a data bus, etc. For the sake of clarity, the various buses are illustrated in FIG. 8 as a bus system 819.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

It should be noted that one or more of the features, functions, procedures, components, elements, structures, etc., described in connection with any one of the configurations described herein may be combined with one or more of the functions, procedures, components, elements, structures, etc., described in connection with any of the other configurations described herein, where compatible. In other words, any compatible combination of the functions, procedures, components, elements, etc., described herein may be implemented in accordance with the systems and methods disclosed herein.

The functions described herein may be stored as one or more instructions on a processor-readable or computer-readable medium. The term "computer-readable medium" refers to any available medium that can be accessed by a computer or processor. By way of example, and not limitation, such a medium may comprise Random-Access Memory (RAM), Read-Only Memory (ROM), Electrically Erasable Programmable Read-Only Memory (EEPROM), flash memory, Compact Disc Read-Only Memory (CD-ROM) or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc, where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server or other remote source using a coaxial cable, fiber optic cable, twisted pair, digital subscriber line (DSL) or wireless technologies such as infrared, radio and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. An electronic device, comprising:
    an image sensor that is configured to capture phase detection data for automatic focusing; and
    an automatic focusing module that is configured to:
        dynamically enable transmission of the phase detection data from the image sensor;
        disable transmission of the phase detection data from the image sensor to an image signal processor in response to determining an initial lens position based on the phase detection data; and
        perform a fine search to determine a final lens position after disabling transmission of the phase detection data.

2. The electronic device of claim 1, wherein the automatic focusing module is configured to enable transmission of the phase detection data from the image sensor in response to detecting a scene change.

3. The electronic device of claim 2, wherein the automatic focusing module is configured to detect a scene change based on one or more of a gyroscope output, automatic exposure control (AEC) exposure information, a sum of absolute differences or digital image correlation.

4. The electronic device of claim 1, wherein the automatic focusing module is configured to disable transmission of the phase detection data from the image sensor until detecting a scene change.

5. The electronic device of claim 1, wherein the automatic focusing module is configured to:
    analyze the phase detection data to determine the initial lens position after enabling transmission of the phase detection data from the image sensor in response to detecting a scene change; and
    subsequently disable transmission of the phase detection data from the image sensor.

6. The electronic device of claim 1, wherein the automatic focusing module is configured to perform the fine search to determine the final lens position based on image data from the image sensor.

7. The electronic device of claim 1, wherein the image signal processor is configured to:
receive image data and the phase detection data from the image sensor when transmission of the phase detection data from the image sensor is enabled; and
receive image data from the image sensor when transmission of the phase detection data from the image sensor is disabled.

8. The electronic device of claim 1, wherein the image signal processor is configured to:
receive phase detection data from the image sensor when transmission of the phase detection data from the image sensor is enabled; and
receive image data from the image sensor when transmission of the phase detection data from the image sensor is disabled.

9. A method, comprising:
capturing, by an image sensor, phase detection data for automatic focusing;
dynamically enabling, by an automatic focusing module, transmission of the phase detection data from the image sensor;
disabling, by the automatic focusing module, transmission of the phase detection data from the image sensor to an image signal processor in response to determining an initial lens position based on the phase detection data; and
performing, by the automatic focusing module, a fine search to determine a final lens position after disabling transmission of the phase detection data.

10. The method of claim 9, wherein dynamically enabling transmission of the phase detection data from the image sensor comprises:
enabling transmission of the phase detection data from the image sensor in response to detecting a scene change.

11. The method of claim 9, wherein detecting the scene change is based on one or more of a gyroscope output, automatic exposure control (AEC) exposure information or a sum of absolute differences.

12. The method of claim 9, further comprising disabling, by the automatic focusing module, transmission of the phase detection data from the image sensor until detecting a scene change.

13. The method of claim 9, further comprising:
analyzing the phase detection data to determine the initial lens position after enabling transmission of the phase detection data from the image sensor in response to detecting a scene change; and
subsequently disabling transmission of the phase detection data from the image sensor.

14. The method of claim 9, wherein performing the fine search to determine the final lens position is based on image data from the image sensor without the phase detection data.

15. The method of claim 9, further comprising:
receiving, at an image signal processor, image data and the phase detection data from the image sensor when transmission of the phase detection data from the image sensor is enabled; and
receiving, at the image signal processor, image data from the image sensor when transmission of the phase detection data from the image sensor is disabled.

16. The method of claim 9, further comprising:
receiving, at an image signal processor, phase detection data from the image sensor when transmission of the phase detection data from the image sensor is enabled; and
receiving, at the image signal processor, image data from the image sensor when transmission of the phase detection data from the image sensor is disabled.

17. An apparatus, comprising:
means for capturing, by an image sensor, phase detection data for automatic focusing; and
means for dynamically enabling, by an automatic focusing module, transmission of the phase detection data from the image sensor;
means for disabling, by the automatic focusing module, transmission of the phase detection data from the image sensor to an image signal processor in response to determining an initial lens position based on the phase detection data; and
means for performing, by the automatic focusing module, a fine search to determine a final lens position after disabling transmission of the phase detection data.

18. The apparatus of claim 17, wherein the means for dynamically enabling transmission of the phase detection data from the image sensor comprise:
means for enabling transmission of the phase detection data from the image sensor in response to detecting a scene change.

19. The apparatus of claim 18, wherein detecting the scene change is based on one or more of a gyroscope output, automatic exposure control (AEC) exposure information or a sum of absolute differences.

20. The apparatus of claim 17, further comprising means for disabling transmission of the phase detection data from the image sensor until detecting a scene change.

21. The apparatus of claim 17, further comprising:
means for analyzing the phase detection data to determine the initial lens position after enabling transmission of the phase detection data from the image sensor in response to detecting a scene change; and
means for subsequently disabling transmission of the phase detection data from the image sensor.

22. A non-transitory tangible computer readable medium storing computer executable code, comprising:
code for causing an image sensor to capture phase detection data for automatic focusing; and
code for causing an automatic focusing module to dynamically enable transmission of the phase detection data from the image sensor;
code for causing the automatic focusing module to disable transmission of the phase detection data from the image sensor to an image signal processor in response to determining an initial lens position based on the phase detection data; and
code for causing the automatic focusing module to perform a fine search to determine a final lens position after disabling transmission of the phase detection data.

23. The computer readable medium of claim 22, wherein the code for causing the automatic focusing module to dynamically enable transmission of the phase detection data from the image sensor comprises:
code for causing the automatic focusing module to enable transmission of the phase detection data from the image sensor in response to detecting a scene change.

24. The computer readable medium of claim 23, wherein the code for causing the automatic focusing module to detect the scene change is based on one or more of a gyroscope output, automatic exposure control (AEC) exposure information or a sum of absolute differences.

25. The computer readable medium of claim 22, further comprising code for causing the automatic focusing module to disable transmission of the phase detection data from the image sensor until detecting a scene change.

26. The computer readable medium of claim 22, further comprising:
- code for causing the automatic focusing module to analyze the phase detection data to determine the initial lens position after enabling transmission of the phase detection data from the image sensor in response to detecting a scene change; and
- code for causing the automatic focusing module to subsequently disable transmission of the phase detection data from the image sensor.

* * * * *